(12) United States Patent
Fuller et al.

(10) Patent No.: US 7,786,893 B2
(45) Date of Patent: Aug. 31, 2010

(54) BATTERY SAVING TWO-WAY COMMUNICATION CIRCUIT AND SYSTEM AND METHOD FOR AUTOMATIC METER READING

(75) Inventors: Glenn C. Fuller, Orlando, FL (US); Shane Clamme, Lerona, WV (US)

(73) Assignee: Technologies To Be, Inc., Orlando, FL (US)

( * ) Notice: Subject to any disclaimer, the term of this patent is extended or adjusted under 35 U.S.C. 154(b) by 1034 days.

(21) Appl. No.: 11/514,241

(22) Filed: Sep. 1, 2006

(65) Prior Publication Data
US 2007/0063867 A1    Mar. 22, 2007

Related U.S. Application Data

(60) Provisional application No. 60/712,898, filed on Sep. 1, 2005.

(51) Int. Cl.
*G08C 15/06*    (2006.01)
(52) U.S. Cl. .............................. 340/870.02; 340/870.01; 370/310; 370/311; 455/67.11
(58) Field of Classification Search ............ 340/870.01, 340/870.02; 370/310, 311; 455/67.11
See application file for complete search history.

(56) References Cited

U.S. PATENT DOCUMENTS

| | | | | |
|---|---|---|---|---|
| 5,553,094 A | * | 9/1996 | Johnson et al. ............. | 375/130 |
| 5,649,303 A | * | 7/1997 | Hess et al. ................. | 455/63.3 |
| 5,757,416 A | * | 5/1998 | Birch et al. ................. | 725/144 |
| 6,333,975 B1 | * | 12/2001 | Brunn et al. ........... | 379/106.03 |
| 7,061,398 B2 | * | 6/2006 | Holmes et al. ......... | 340/870.01 |
| 7,412,338 B2 | * | 8/2008 | Wynans et al. ................ | 702/61 |
| 2001/0004375 A1 | * | 6/2001 | Partyka ...................... | 375/135 |
| 2005/0206530 A1 | * | 9/2005 | Cumming et al. ...... | 340/870.02 |
| 2005/0237959 A1 | * | 10/2005 | Osterloh et al. ............. | 370/310 |

\* cited by examiner

*Primary Examiner*—Timothy Edwards, Jr.
(74) *Attorney, Agent, or Firm*—Baker & Hostetler LLP

(57) ABSTRACT

A battery-powered two-way long range automatic meter reading system and method that increases battery longevity. The system includes a meter side unit (MSU) transceiver that acquires utility data, a centralized data collector (Collector) that gathers data from the MSU, and a repeater to facilitate long-range transmission by shuttling radio signals around physical or geographic transmission barriers. The MSU includes a circuit to monitor the passage of time and apply power to a transmitter in response to a predetermined elapsed period of time. The MSU transceiver monitors a predetermined radio channel for traffic. In response to the predetermined radio channel being essentially clear of signal traffic, the MSU sends utility data to the collector. The MSU scans for a reply from the collector. In response to the collector having control data to transmit to the MSU, the collector transmits this control data in response to receiving a transmission from the MSU. The MSU is configured to enter a sleep mode. In response to receiving commands from the collector, the MSU is configured to perform the commands.

52 Claims, 3 Drawing Sheets

US 7,786,893 B2

BATTERY SAVING TWO-WAY COMMUNICATION CIRCUIT AND SYSTEM AND METHOD FOR AUTOMATIC METER READING

CROSS REFERENCE TO RELATED APPLICATIONS

This application claims priority to U.S. Provisional Patent Application Ser. No. 60/712,898, filed on Sep. 1, 2005, titled "BATTERY SAVING TWO-WAY COMMUNICATION CIRCUIT AND SYSTEM AND METHOD FOR AUTOMATIC METER READING," the disclosure of which is incorporated herein by reference in its entirety.

FIELD OF THE INVENTION

The present invention relates generally to a transmitting circuit. More particularly, the present invention relates to a battery saving two way communication circuit for use in an automatic meter reading system and a method of use.

BACKGROUND OF THE INVENTION

It is generally known that metering systems are utilized to collect or display utility data so that a utility company can determine utility usage of its customers and assess appropriate fees for those customers. To collect the utility data, utility companies have conventionally employed people as meter readers to visit each meter individually and record the displayed data.

Initial efforts to improve this process focused upon eliminating transcription errors and automating the process of moving meter reading data from the human meter reader into a utility billing system. Systems where developed that allowed the meter reader to record meter readings in a portable electronic device. These devices allowed the meter reader to download meter data from a billing system, and upload meter reading data back into the billing system.

Other conventional method of improving the system included attaching short-range transmitters or transceivers to the meters. These transceivers allowed receivers mounted in vehicles to collect meter reading data as the vehicle passed into near proximity of the meters. These conventional systems were generally configured so that the meter side unit regularly transmitted meter information every few seconds. In this manner, a passing vehicle and data receiver is typically in range when the meter side unit is transmitting. Another conventional method utilizes "vigilant" meter side units that constantly listen for a "wake-up call" and transmit the utility data in response to receiving this wake-up call from a passing vehicle and data receiver.

Unfortunately, these and other conventional devices draw too much power to be economically operated with a battery at a longer range. That is, due to the frequency of battery replacement, these conventional systems are not cost effective when their technology is extended to long range operation.

Accordingly, it is desirable to provide a battery saving two way communication circuit for use in an automatic meter reading system and a method of use that is capable of overcoming the disadvantages described herein at least to some extent.

SUMMARY OF THE INVENTION

The foregoing needs are met, to a great extent, by the present invention, wherein in some embodiments a battery saving two way communication circuit for use in an automatic meter reading system and a method of use are provided.

An embodiment of the present invention relates to an automatic meter reading system. The system includes a meter-side unit and a collector. The meter-side unit is configured to receive a meter signal from a meter. The collector is configured to receive meter signals from the meter-side unit. The meter-side unit is configured to remain in a sleep mode for a predetermined amount of time. The meter-side unit being configured to enter a wake mode after the predetermined amount of time and forward the meter signal to the collector in response to waking.

Another embodiment of the present invention pertains to a method of automatically reading a meter. In this method, a meter-side unit remains in a sleep mode for a predetermined sleep cycle to conserve a supply of power in the meter-side unit, the meter-side unit enters a wake mode in response to an elapse of the sleep cycle, and a meter signal is transmitted from the meter-side unit to a collector in response to entering the wake mode. The meter-side unit is operably attached to the meter and the meter-side unit is remote from the collector.

Yet another embodiment of the present invention relates to a computer readable medium on which is embedded computer software comprising a set of instructions for executing a method of automatically reading a meter. In this method, a meter-side units remains in a sleep mode for a predetermined sleep cycle to conserve a supply of power in the meter-side unit, the meter-side unit enters a wake mode in response to an elapse of the sleep cycle, and a meter signal is transmitted from the meter-side unit to a collector in response to waking. The meter-side unit is operably attached to the meter and the meter-side unit is remote from the collector.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE INVENTION

The present invention provides, in some embodiments, a battery saving two way communication circuit for use in an automatic meter reading (AMR) system and a method of use.

Figure 1:
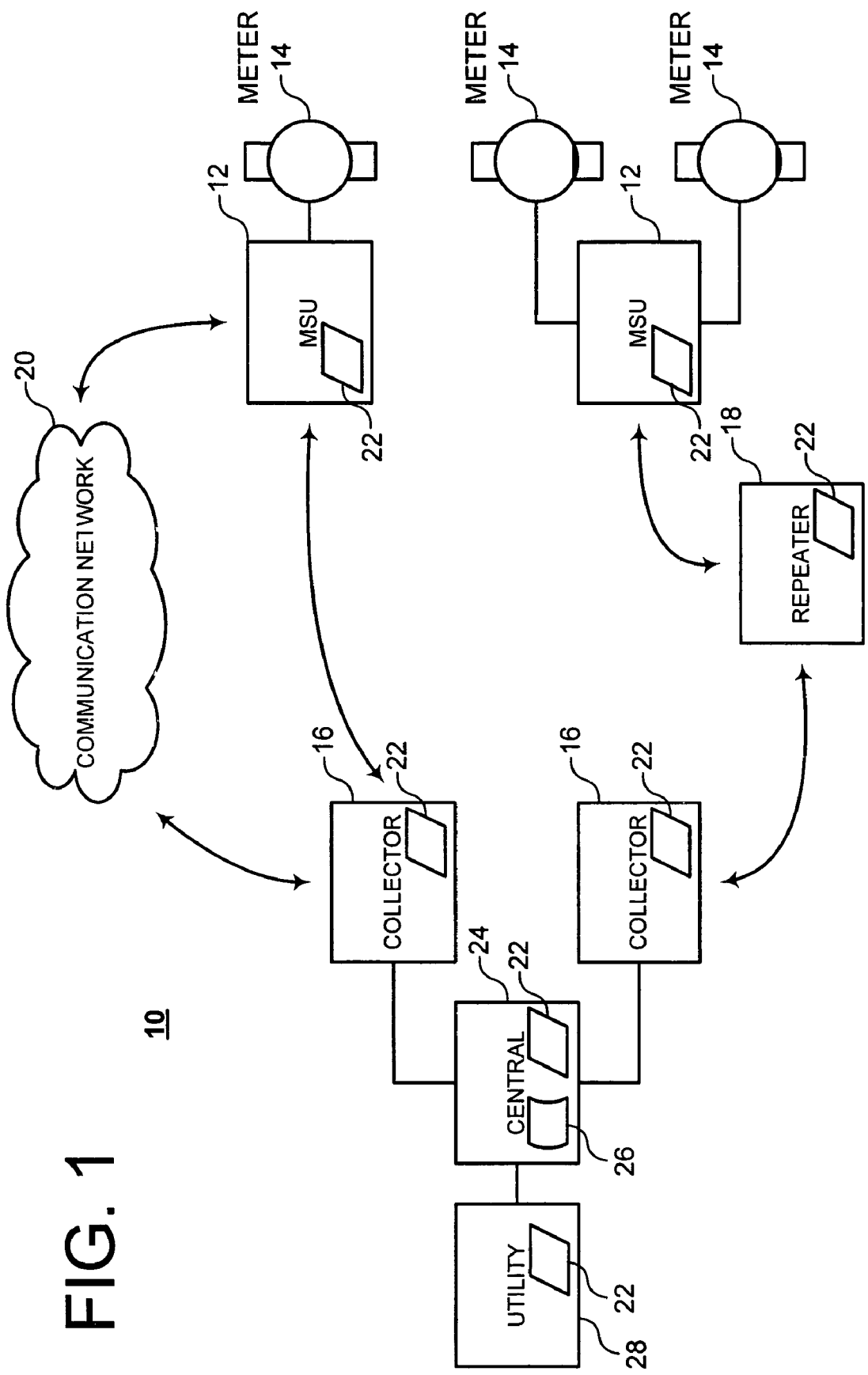
FIG. 1 is a block diagram of a system architecture for an automatic meter reading (AMR) system according to an embodiment of the invention.

FIG. 1 is a block diagram of a system architecture for an AMR system 10 according to an embodiment of the invention. As shown in FIG. 1, the AMR system 10 includes a meter-side unit (MSU) 12 configured to communicate with a meter 14. The MSU 12 is configured for direct and/or indirect two-way communication with a collector 16. To facilitate indirect communication, the AMR system 10 optionally includes a repeater 18 and/or a communication network 20. In an embodiment, the MSU 12 collects utility usage data from the meter 14 and stores this usage data to a file 22. The file 22 is transmitted from the MSU 12 to the collector 16. The file 22 may be forwarded to a central collector 24 and stored to a database 26 for example. The file 22 may further be accessed by a utility 28 to determine utility usage of a customer.

In an embodiment, the MSU 12 is configured to control the meter 14. For example, in response to a signal from the utility 28 via the central collector 24 and/or the collector 16, the MSU 12 is configured to control or modulate the meter 14. In a particular example, in response to a "shut off" signal, the MSU 12 is configured to modulate a valve connected in series with the meter 14 to move to a closed position.

In contrast to conventional battery saving techniques which depend upon controlling or regulating the period of time that a receiver remains in a vigilant mode and is scanning or otherwise operable to receive control commands from a central station, embodiments of the present invention improves the battery life by initiating communications from the MSU 12 rather than the central station. Using this communications method, the MSU 12 transmits the file 22 to the collector 16, and then scans for a response from the collector 16 during a relatively brief period of time after the MSU 12 has transmitted its data. This approach reduces the period of time that a receiver is in a vigilant mode to, for example, a few seconds per reporting period, and allows the MSU 12 to operate on battery power for many years.

In an embodiment, the collector 16 remains in a vigilant mode and the MSU 12 scans for signals from the collector 16 for a relatively brief period of time following a transmission from the MSU 12. This new approach reduces a duty cycle for the MSU 12 as compared to conventional systems, and therefore prolonges battery life at the MSU 12 for a two-way long-range fixed-network AMR system 10.

Embodiments of the present invention facilitate a point to multi-point communication system, where the central collector 24 is located at a place that is configured to reduce close proximity with people on a regular basis. The MSUs 12 are located in close proximity to utility meters 14, with one, two, or more meters 14 to the MSU 12. The MSUs 12 so installed is configured to be distributed throughout the service area of the utility 28. The MSUs 12 may typically be installed on top of or inside utility meter 14 boxes or on the sides of buildings. In a specific example, the MSUs 12 are configured to transmit their utility data, by default, 6 (six) times per day. Each transmission is configured to last, on average for less than 0.4 seconds, (but may be made up of multiple transmissions configured to last an average no more than, for example, 0.8 seconds). Therefore, possible exposure to signals for individuals who happen to be in the proximity of the MSU 12 is reduced.

Figure 2:
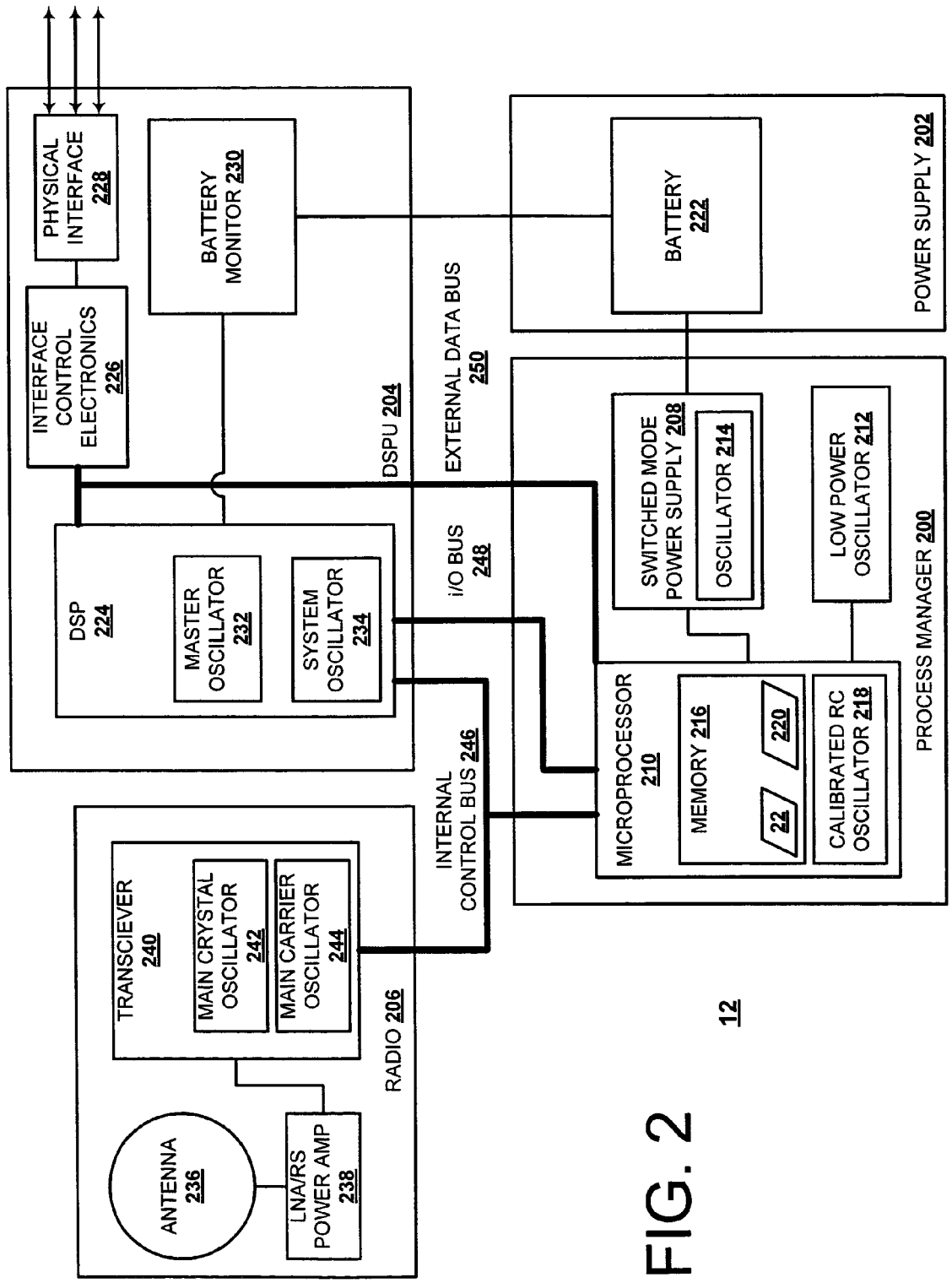
FIG. 2 is a block diagram of a system architecture for a meter-side unit (MSU) suitable for use with the AMR system according to FIG. 1.

FIG. 2 is a block diagram of a system architecture for the MSU 12 according to an embodiment of the invention. As shown in FIG. 2, the MSU 12 includes a process manager 200, power supply 202, digital signal processing unit (DSPU) 204, and a radio 206. In general, the MSU 12 is a transceiver designed to gather meter and utility data from a data device (such as the utility meter 14) in the field and transfer that data to the central collector 24, and receive control data from the central collector 24. In addition to meter and utility data, the MSU 12 may be configured to receive signals from any suitable sensor. Examples of suitable sensors include telemetry devices, pressure gauges, rain gauges, temperature sensors, and the like. In a particular example, the MSU 12 is configured to receive, store, and transmit signals from a pressure sensor. The pressure sensor may be configured to sense fluid pressure within a pipe or supply line. In this manner, a supplier of the fluid in the supply line may monitor attributes of the fluid.

In a particular embodiment, the MSU 12 uses frequency modulation in the industrial, scientific and medical (ISM) band (902-928 MHz). The MSU 12 uses frequency hopping spread spectrum techniques to create a dynamic, interference resistant and jam resistant communications channel between the MSU 12 and the central collector 24. Due to government restrictions, the maximum allowed power in the transmitted signal is 1 watt. Power management techniques between the MSU 12 and collector 16 may step down the transmission power should the signal strength at the receiving end justifies a reduced transmission power.

Encryption techniques may be utilized to secure the communications channel between the MSU 12 and the central collector 24, in order to mask utility data from inquisitive listeners, and to prevent the spoofing of commands from the central collector 24 to the MSU 12. According to various embodiments, any suitable encryption technique may be utilized.

The process manager 200 is configured to determine sleep and/or wake modes or cycles and provide the various components with power from the power supply 202 in response to the determination that a wake cycle has occurred. The process manager 200 includes a switched mode power supply unit 208, microprocessor 210, and low power oscillator 212. The switched mode power supply unit 208 includes an oscillator 214 such as a 350 kilohertz (kHz) to 1.2 Mega hertz (MHz) oscillator, for example. The microprocessor 210 includes a memory 216 and calibrated resistor and capacitor (RC) oscillator 218 such as a 4 MHz oscillator, for example. The microprocessor 210 includes any suitable processor. Examples of suitable processors include relatively low power and/or low frequency integrated circuits or chips. The memory 216 is configured to store the file 22 and/or a code 220. The code 220 includes a set of computer executable instructions configured to control the MSU 12. The low power oscillator 212 may include a 32.768 kHz oscillator for example.

The power supply 202 is configured to supply power to the various components of the MSU 12. In various embodiments, the power supply 202 includes one or more of a battery, capacitor, fuel cell, photovoltaic device, and the like. In addition, the power supply 202 may include a power inlet to receive power from an external source. In a particular example, the power supply 202 includes a battery 222.

The DSPU 204 is configured to gather utility usage data from the meter 14 and process this data. The DSPU 204 includes a digital signal processor (DSP) 224, interface control electronics 226, physical interface 228, and battery monitor 230.

The DSP 224 is configured to receive utility usage data from the meter 14 via the physical interface 228 and/or the interface control electronics 226, process the data and forward the processed data to the microprocessor 210 and or the radio 206. In addition to the meter 14, the DSP 224 may receive data from remote telemetry devices. Examples of remote telemetry devices include, at least, pressure transducers, rain gauges, temperature sensors, and the like. The DSP 224 is optionally configured to forward controlling signals from the microprocessor 210 to the meter 14. In this manner, the meter 14 may be modulated by the MSU 12 in response to signals received by the MSU 12 from the collector 16. For example, the MSU 12 may turn the meter 14 on or off or otherwise modulate a flow of fluid therethrough in response to received signals. The DSP 224 may include one or more clocks or oscillators. For example, the DSP 224 may include a relatively low power usage clock that is utilized during a sleep cycle and a relatively higher power usage clock to control processor cycle times and the like. In a particular example, the DSP 224 includes a master oscillator 232 and system oscillator 234. The master oscillator 232 may include a relatively low power output 8 MHZ, calibrated RC master oscillator for example. The master oscillator 234 may include a 120 MHz oscillator.

The interface control electronics 226 is configured to forward signals from the physical interface 228 to the DSP 224. In addition, the interface control electronics 226 may be configured to forward signals from the DSP 224 to the physical interface 228. Furthermore, the interface control electronics 226 may be configured to convert analog signals to digital signals and/or vice versa.

The physical interface 228 is configured to receive signals from one or more devices such as the meters 14 and forward these signals to the interface control electronics 226. In addition, the physical interface 228 may be configured to receive signals from the interface control electronics 226 and forward these signals to one or more devices such as the meters 14. In various embodiments, the physical interface 228 is configured to interface with one, two, three, or more of the meters 14. For example, the MSU 12 may be located in or near an apartment complex or other such structure with multiple users. In this or other such situations, the MSU 12 may be configured to interface with some or all the meters 14. Accordingly, the physical interface 228 may be configured to interface with 100 or more of the meters 14.

The battery monitor 230 is configured to perform and/or record the result of a battery load test on a regular basis. This load test data, along with data that indicates the power of the transmission, is transmitted to the central collector 24 along with the other raw data collected by the MSU 12. The load test data is deposited into the database 26. The database 26 may be utilized to develop techniques to predict a failing battery or otherwise identify battery or load test trends.

The radio 206 is configured to generate and receive signals. In a particular example, the radio 206 operates in the industrial, scientific and medical (ISM) band (902-928 MHz). The radio 206 may be configured to operate in the FCC Part 15 rules, with particular attention paid to Part 247. For example, the ISM band may be divided into 25 KHz channels, with the first channel occurring at 902.025 MHz, the second channel at 902.050 MHz, and so on.

The MSUs 12 are allocated to a frequency hop set containing 61 frequencies. If density of the MSUs 12 (e.g., the number of MSUs 12 per a given area) or terrain features (which create multi-path noise or collision issues) require more than one frequency hop set for a utility, then 3 or more such hop sets may be established, with each MSU 12 may be assigned to a single set of hop frequencies.

If more than one frequency hop set is used, the frequencies of the hop sets are interleaved, such that the first hop set utilizes channel 0, 3, 6, 9 . . . the second hop set utilizes channel 1,4,7,10 . . . and the third hop set utilizes channel 2,5,8,11 . . . .

A maximum length sequence (MLS) or M sequence is a pseudorandom binary sequence used as a basis for deriving pseudo-random sequences in digital communication systems that employ direct-sequence spread spectrum and frequency-hopping spread spectrum transmission systems. M sequences generally employ polynomial rings generated using maximal linear feedback shift registers and are so called because they are periodic and reproduce every binary sequence that can be reproduced by the shift registers (i.e., for m registers they produce a sequence of length $2^m-1$). Each MSU 12 may be configured to use the frequencies of the hop set to which it is assigned. In various embodiments, random selection of frequency may use the wake-up time of the MSU 12 as input into the M sequence, or simply take the next value off of the top of the M sequence. For example, in an embodiment, each MSU, before initiating a transmission, may query a clock or oscillator to determine the time and select a frequency from its hop set based on the determined time. Similarly, the collector 12 may be configured to receive signals based upon the time. In this manner, communication between the MSU 12 and the collector 12 may be facilitated. In another embodiment, each MSU, before initiating a transmission, may randomly select a frequency from its hop set using a simple M sequence approach. In this regard, the MSU may include a table stored in the code 220 or otherwise in the memory 216 that is configured to cause the M-sequence to work around frequencies that may contain interference, or those that may be forced to be not used if interference to outside receivers is prevalent. The tables may cause the transmitters to increase power, or to skip certain channels. These tables are dynamic, and may be arranged so that the 50-channel minimum is configured to be observed, if frequencies are skipped.

The radio 206 may be configured to send signals associated with the file 22 in response to commands from the microprocessor 210 and/or the DSP 224. In another example, the radio 206 is configured to receive signals from the collector 16 and forward the received signals to the microprocessor 210 and/or the DSP 224. The radio 206 may be configured to send signals at a predetermined power level and/or duration. For example, the radio 206 may send a signal for a period of less than 0.4 seconds, at a signal strength of at, or less than, 1 watt. The MSUs 12, repeaters 18, and collectors 16 are configured to relay signal-strength information during the initial packets of communications. Based upon the signal-strength information, the MSUs 12 may reduce transmission power output and thereby avoid unnecessary power levels. In this manner, the transmitter may be controlled to reduce power output. This reduces interference and prolongs battery life. Also, the maximum amount of power utilized to transmit may be set to any suitable value. For example a maximum transmitter power level may include 1 watt. On frequencies where power may be upped to establish communications, power level may be determined as a side-effect of automatic repeat request (ARQ) negotiation.

The radio 206 is controlled via the microprocessor 210 to, within a packet, for a given period of less than 0.4 seconds, emit a signal that is non-coherent frequency shift keying ("FSK") modulated at two levels at an 1831-baud rate using Manchester as the signaling method. The deviation of the signal is configured to be at or within 1800 Hz to 1000 Hz, resulting in a modulation index from ~0.55 to ~1.0. Carson's rule is configured to place the bandwidth between ~5600 Hz and ~7200 Hz. The receive filter is configured to handle a 7500 Hz bandwidth signal. The modulation signal is shaped (through a simple lowpass filter and a rubbered crystal) to have its harmonics limited. The passband is about between a raised-cosine and Gaussian function. This keeps adjacent-channel interference down and increases the receiver's extraction capabilities by reducing the effects of the intermediate frequency ("IF") filter upon the signal. The choice of narrowband emission is partly from channel gain/noise capability, and part rejection capability of digital-modulation spread-spectrum emissions.

The antenna 236 is configured to generate and receive signals. In a particular embodiment, the antenna 236 includes a 4 decibel (dB) antenna. With 4 dB antennas, data communications range is approximately 2 miles. This allows the MSU 12 connected to the AMR system 10 to send meter reading data through a fixed network back to the utility 28. It is an advantage of this and other embodiments that there is no need to walk or drive-by the MSU 12 to read the meters 14 change the behavior of the MSU 12, or send commands to the meters 14. The radio 206 may also include an amplifier 238, and transceiver 240.

The amplifier 238 is preferably configured to amplify signals received by the antenna 236 and/or amplify signals that are forwarded to the antenna 236. The transceiver 240 preferably is configured to generate signals based on signals received from the microprocessor 210 and/or the DSP 224 and forward these signals via the amplifier 238 to the antenna 236. The transceiver 240 may also configured to forward signals received by the antenna 236 to the microprocessor 210 and/or the DSP 224. The transceiver 240 includes a main crystal oscillator 242 and a main carrier oscillator 244. The main crystal oscillator 242 may include a 24.576 MHz oscillator for example.

To intercommunicate between the various components of the MSU 12, the MSU 12 may include one or more busses such as an internal control bus 246, an input/output (I/O) bus 248, and an external data bus 250. The internal control bus 246 may be configured to facilitate intercommunication between the microprocessor 210, the DSP 224, and the transceiver 240. The I/O bus 248 may be configured to facilitate intercommunication between the microprocessor 210 and the DSP 224. The external data bus 250 may be configured to facilitate intercommunication between the microprocessor 210, the DSP 224, and the interface control electronics 226.

Figure 3:
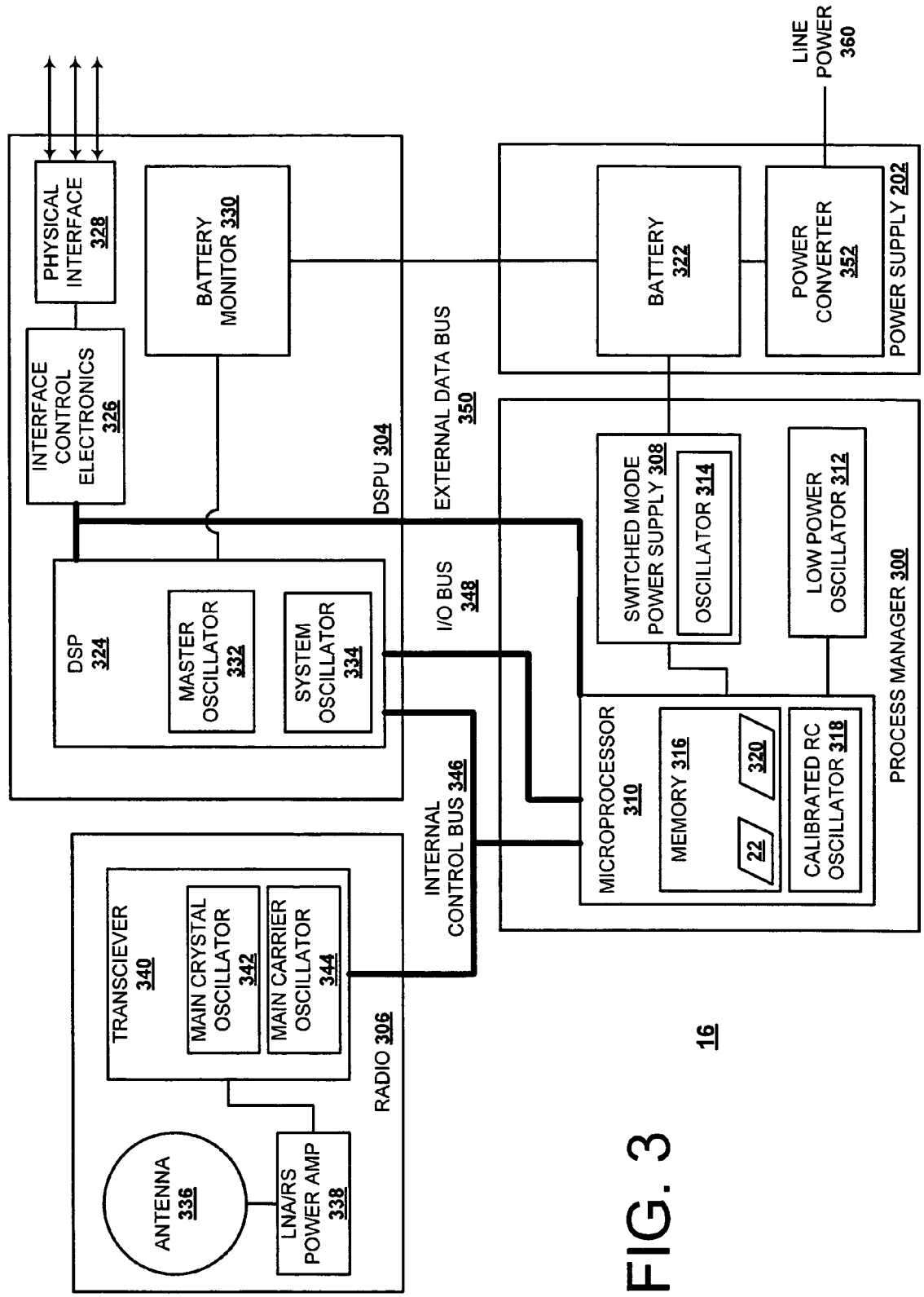
FIG. 3 is a block diagram of a system architecture for the collector suitable for use with the AMR system according to FIG. 1.

FIG. 3 is a block diagram of a system architecture for the collector 16 according to an embodiment of the invention. As shown in FIG. 3, system architecture of the collector 16 is similar to the system architecture of the MSU 12, and thus, only those items that differ are discussed hereinbelow.

The collector 16 is optionally hard wired to a line power 360 to facilitate remaining in a vigilant mode and scanning for signals from the MSU 12.

In an embodiment, the radio 206 is intermittently powered through the switched mode power supply unit 208 so as to reduce the use of electrical power consumption. When powered, the MSU 12 scans the communications channel for traffic, and transmits collected data to the central collector 24 when the communications channel is clear. The central collector 24 is preferably configured to receive transmitted data and, upon receiving the transmission, responds to the MSU 12. The MSU 12, upon receiving the response from the central collector 24, or after waiting for a brief period after transmission, returns to a sleep mode. It is an advantage of this and other embodiments that this approach reduces the period of time that power is applied to the radio transceiver, and so increases battery life in the MSU 12.

To reduce collisions on the communications channels, the MSU 12 according to various embodiments is configured to perform a variety of protocols. For example, the MSU 12 may be configured to scan the communications channel prior to beginning its transmission. In another example, multiple channels may be assigned to each MSU 12 in order to reduce collisions on a given radio frequency. In another example, the same frequency hop set can be shifted in time between two different collectors in order to prevent collisions. In yet another example, groups of MSUs 12 may be assigned different frequency hop channel sets in order to prevent collisions between collectors that are in close proximity to one another. In this manner, multiple central collectors may operate near one another without interfering with one another, and so increases the available density of MSUs 12. In the event that buildings, trees or geographic features interfere with the line-of-site of MSUs 12 to the central station, repeaters may be used to route the signal around the obstructions.

According to an embodiment, each MSU 12 may be programmed to initiate a wake-mode and transmit data in response to specific external stimulus in addition to its regularly scheduled wake cycle. For instance, when attached to the AMR system 10, the MSU 12 may transmit a report to the central collector 24 in response to a suitable event. Examples of suitable events include one or more of: detecting meter tampering, reverse flow event, and the like.

The central collector 24 may be configured to essentially constantly scan a range of frequencies or super-scan the frequencies of a single hop-set. Upon detecting the MSU 12 transmission, the central collector 24 may respond to the MSU 12 on a channel exactly 21.4 MHz above the frequency used by the MSU 12. The MSU 12 is configured to listen to that channel for a response from the central collector 24.

If the MSU 12 does not receive a response from the central collector 24 or collector 16, or if the collector 16 response is one that indicates that the collector 16 received an incomplete transmission from the MSU 12, then the MSU 12 is configured to select another frequency randomly from its hop set and resend the transmission. The MSU 12 may be configured to resend the communication a predetermined number of times. For example the MSU 12 may be configured to perform 5 such transmission before entering a sleep mode. Once in sleep mode after 5 tries, it is configured to enter the wake-mode at a later time and repeat the transmission to the central collector 24.

The communications approach is such that, under normal circumstances, a single transmission from the MSU 12 is configured to contain all of the needed transmission data. A single transmission may contain multiple meter readings and the times of those meter readings. As a result, under normal circumstances, the MSU 12 is configured to only need a single transmission of less than, for example, 0.4 seconds in order to meet its data transmission goals.

If control data is passed back from the central collector 24 to the MSU 12, then the transmission is configured to proceed approximately as follows:

MSU: Scan the radio channel to avoid collisions
MSU: Transmits meter data to Collector
Collector: Transmits received meter data, control data to follow
MSU Transmits ready to receive control data
Collector: Transmits first bit of control data
MSU Transmits received first bit, ready for next . . .

Collector Transmits next bit of control data . . . Loop through the last two messages until . . .

Collector Transmits last bit of control data. End Conversation.

Each packet of data may include a 32 bit MSU ID and the data from the last data collection effort (usually a meter reading). The 32 bit MSU ID is, preferably, not encrypted. The data is, preferably, encrypted. Each data packet is aligned, with the header containing an operation (OP) code of the message.

In a particular example, data is organized into packets in a frame, with the end of each frame containing error correction code. The packet ends with 1 word of cyclic redundancy codes (CRC) and 4 more words that make up a check sum that is derived from the rest of the message.

The purpose of the CRC is to further qualify the data after it runs through the parity correction system. The parity correction system has a strength of four octets (1 in 4 billion.) This adds two more octets to the error-detecting strength (1 in 2.8e14.) The CRC is calculated by running the body first-bit-first through a 16-bit shift register with generator polynomial $x^15+x^13+x^0$ (0xA001 XOR value) and then taking the resulting 16-bit number and placing it in the Post CRC position (highest order octet first.) In receive, the CRC value is generated the same way with the 70-octet body, and then compared with the Post CRC value (same octet order.) If they match, the data is considered valid.

The check sums are computed from the data in the rest of the frame (not including the preamble). The check-sum data uses the Reed Solomon Code247/255 approach. The raw data has a single word put on top of it for CRC purposes. The raw data and CRC word are subjected to a Reed Solomon generator.

The transmitter attempts to transmit the entire data packet.

The receiver attempts to receive the entire packet. If the receiver bit counter indicates that the entire packet has been received, the packet is passed to a Reed Solomon decoder which uses the last 4 words to perform error correction. In this manner, up to 4 errors may be corrected.

If the Reed Solomon decoder cannot accurately decode the packet (including using the 4 words of error correction) then the entire packet may be rejected.

If the decoder can decode the message, then the Reed Solomon polynomials are applied to the packet and it goes through CRC for correction. In this manner, the raw data is extracted from the packet.

If the signal gets near the noise threshold, then sputter interference becomes a problem. Reed Solomon decoding facilitates extracting data from packets in the presence of sputter interference. It is an advantage of this and other embodiments that without Reed Solomon, the data runs into problems 9 or 10 dB above the noise. With Reed Solomon, the data is usable at 3 or 4 dB above the noise.

In the event that two or more collectors 16 can receive the transmission of a particular MSU 12, in an embodiment, only one collector 16 is configured to respond. To avoid multiple responses to the MSU 12, and to make it more difficult to duplicate, copy, spoof, or otherwise emulate a MSU 12 transmission to the collector 16, the collector 16 is configured to only respond to MSUs 12 that are entered into the collector's list of valid MSUs 12. This list may include an identification (ID) for the MSU 12. For example, the ID may include a 32 bit ID, and optionally a corresponding matched encryption key pair for the given MSU 12.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An automatic meter reading system comprising:
  a meter-side unit to receive a meter signal from a meter; and
  a collector to receive the meter signal from the meter-side unit and forward a collector signal to the meter-side unit in response to the meter signal, wherein the meter-side unit is configured to remain in a sleep mode for a predetermined amount of time, the meter-side unit being configured to enter a wake mode after the predetermined amount of time and forward the meter signal to the collector in response to the wake mode and wherein the meter-side unit is configured to receive the collector signal; and
  a radio passband filter that maximizes extraction of a received signal by avoiding an intermediate frequency filter.

2. The automatic meter reading system according to claim 1, further comprising: a battery to power the meter-side unit.

3. The automatic meter reading system according to claim 1, wherein the meter-side unit is configured to modulate the meter in response to a collector signal received from the collector.

4. The automatic meter reading system according to claim 1, further comprising: a repeater to receive the meter signal from the meter-side unit and forward the meter signal to the collector, the repeater being further configured to receive a collector signal from the collector and forward the collector signal to the meter-side unit.

5. The automatic meter reading system according to claim 1, further comprising: a communications network to receive the meter signal from the meter-side unit and forward the meter signal to the collector, the communications network being further configured to receive a collector signal from the collector and forward the collector signal to the meter-side unit.

6. The automatic meter reading system according to claim 1, wherein the meter-side unit is configured to encrypt the meter signal using dynamic encryption techniques.

7. The automatic meter reading system according to claim 1, wherein the meter-side unit is configured to monitor a first radio frequency and transmit the meter signal at the first radio frequency in response to the first radio frequency being clear, the meter-side unit being configured to select a second radio frequency in response to detecting signals at the first radio frequency.

8. The automatic meter reading system according to claim 1, wherein the meter-side unit is configured to determine a signal strength that the collector receives the meter signals and reduce a transmission power in response to the signal strength being relatively more powerful than required for reliable communications.

9. The automatic meter reading system according to claim 1, wherein the meter-side unit is configured to employ a Reed Solomon technique to make the meter signal resistant to noise and interference.

10. The automatic meter reading system according to claim 1, wherein the meter-side unit is configured to minimize power consumption by remaining in sleep mode until a predetermined wake time and the meter-side unit is configured to minimize wake time by initiating communication with the collector and receiving the meter signal from the meter according to a predetermined schedule that facilitates efficient usage of processor cycles.

11. The automatic meter reading system according to claim 1, further comprising: an identification signal, wherein the meter-side unit is configured to forward the identification signal to the collector to identify the meter-side unit among a plurality of meter-side units.

12. The automatic meter reading system according to claim 1, further comprising: a battery monitoring system that collects battery data to predict battery failure.

13. The automatic meter reading system according to claim 1, further comprising: a telemetry device, wherein the meter-side unit is configured to receive telemetry signals from the telemetry device and forward the telemetry signals to the collector.

14. The automatic meter reading system according to claim 13, wherein the telemetry device includes one or more of a pressure transducer, rain gauge, and temperature sensor.

15. The automatic meter reading system according to claim 1, wherein the meter-side unit includes a radio communication schema to forward the meter signals utilizing a frequency hopping spread spectrum radio communication protocol that creates a jam resistant and noise resistant radio communications layer.

16. The automatic meter reading system according to claim 15, wherein the radio communication schema minimizes collisions by allowing an adjacent collector to operate on non-colliding communications mechanisms.

17. The automatic meter reading system according to claim 1, wherein the meter-side unit is configured to employ a cyclic redundancy code to monitor for data corruption.

18. The automatic meter reading system according to claim 17, wherein the meter-side unit is configured to employ a Reed Solomon techniques to make the meter signal resistant to noise and interference and the meter-side unit is configured to employ the cyclic redundancy code to monitor for data corruption, wherein the meter-side unit is configured to make real-time analysis and error correction of a transmitted communications packet.

19. A method automatically reading a meter, the method comprising:
    remaining in a sleep mode for a predetermined sleep cycle to conserve a supply of power in a meter-side unit operably connected to the meter;
    entering a wake mode in response to an elapse of the sleep cycle;
    transmitting a meter signal from the meter-side unit to a collector in response to entering the wake mode;
    increasing extraction of a received signal by utilizing a radio passband filter that avoids an intermediate frequency filter; and
    transmitting a collector signal from the collector to the meter-side unit.

20. The method according to claim 19, further comprising: powering the meter-side unit with a battery.

21. The method according to claim 19, further comprising: transmitting a collector signal from the collector to the meter-side unit; and modulating the meter in response to the collector signal.

22. The method according to claim 19, further comprising: repeating the meter signal from the meter-side unit to the collector via a repeater; repeating the collector signal from the collector to the meter-side unit via the repeater.

23. The method according to claim 19, further comprising: repeating the meter signal from the meter-side unit to the collector via a communications network; repeating the collector signal from the collector to the meter-side unit via the communications network.

24. The method according to claim 19, further comprising: encrypting the meter signal prior to transmitting.

25. The method according to claim 19, further comprising: receiving a telemetry signal from a telemetry device; and transmitting the telemetry signal from the meter-side unit to the collector.

26. The method according to claim 19, further comprising: monitoring a first radio frequency; transmitting the meter signal at the first radio frequency in response to the first radio frequency being clear; and selecting a second radio frequency in response to detecting signals at the first radio frequency.

27. The method according to claim 19, further comprising: determining a signal strength for the meter signal at the collector; and reducing a transmission power in response to the signal strength being relatively more powerful than required for reliable communications.

28. The method according to claim 19, further comprising: employing a Reed Solomon technique to make the meter signal resistant to noise and interference.

29. The method according to claim 19, further comprising: reducing power consumption by remaining in the sleep mode until a predetermined wake time; and reducing an elapsed time in the wake mode by initiating communication with the collector and receiving the meter signal from the meter according to a predetermined schedule that facilitates efficient usage of processor cycles.

30. The method according to claim 19, further comprising: identifying the meter-side unit among a plurality of meter-side units by transmitting an identification signal.

31. The method according to claim 19, further comprising:
    collecting battery data; and
    predicting battery failure in response to the battery data.

32. The method according to claim 19, further comprising: transmitting the meter signal according to a radio communication schema, the radio communication schema including a frequency hopping spread spectrum radio communication protocol that creates a jam resistant and noise resistant radio communications layer.

33. The method according to claim 32, further comprising: reducing collisions by allowing an adjacent collector to operate on non-colliding communication frequency in accordance with the radio communications schema.

34. The method according to claim 19, further comprising: employing a cyclic redundancy code to monitor for data corruption.

35. The method according to claim 34, further comprising: analyzing and correcting errors in a transmitted communications packet in real-time by employing a Reed Solomon techniques to make the meter signal resistant to noise and interference and employing the cyclic redundancy code to monitor for data corruption.

36. The medium according to claim 34, further comprising: instructions that cause a computer to analyze and correcting errors in a transmitted communications packet in real-time by employing a Reed Solomon techniques to make the meter signal resistant to noise and interference and employing the cyclic redundancy code to monitor for data corruption.

37. A computer readable medium on which is embedded computer software comprising a set of instructions for executing a method of automatically reading a meter, the medium comprising:

instructions that cause a computer to remain in a sleep mode for a predetermined sleep cycle to conserve a supply of power in a meter-side unit operably connected to the meter;

instructions that cause a computer to enter a wake mode in response to an elapse of the sleep cycle;

instructions that cause a computer to increase extraction of a received signal by utilizing a radio passband filter that avoids an intermediate frequency filter;

instructions that cause a computer to transmit a meter signal from the meter-side unit to a collector in response to entering the wake mode; and instructions that cause a computer to transmit a collector signal from the collector to the meter-side unit.

38. The medium according to claim 37, further comprising: instructions that cause a computer to powering the meter-side unit with a battery.

39. The medium according to claim 37, further comprising: instructions that cause a computer to transmit a collector signal from the collector to the meter-side unit; and instructions that cause a computer to modulate the meter in response to the collector signal.

40. The medium according to claim 37, further comprising:
instructions that cause a computer to repeat the meter signal from the meter-side unit to the collector via a repeater; and instructions that cause a computer to repeat the collector signal from the collector to the meter-side unit via the repeater.

41. The medium according to claim 37, further comprising:
instructions that cause a computer to repeat the meter signal from the meter-side unit to the collector via a communications network; and instructions that cause a computer to repeat the collector signal from the collector to the meter-side unit via the communications network.

42. The medium according to claim 37, further comprising: instructions that cause a computer to encrypt the meter signal prior to transmitting.

43. The medium according to claim 37, further comprising: instructions that cause a computer to receive a telemetry signal from a telemetry device; and instructions that cause a computer to transmit the telemetry signal from the meter-side unit to the collector.

44. The medium according to claim 37, further comprising:
instructions that cause a computer to monitor a first radio frequency;

instructions that cause a computer to transmit the meter signal at the first radio frequency in response to the first radio frequency being clear; and instructions that cause a computer to select a second radio frequency in response to detecting signals at the first radio frequency.

45. The medium according to claim 37, further comprising:
instructions that cause a computer to determine a signal strength for the meter signal at the collector; and instructions that cause a computer to reduce a transmission power in response to the signal strength being relatively more powerful than required for reliable communications.

46. The medium according to claim 37, further comprising: instructions that cause a computer to employ a Reed Solomon technique to make the meter signal resistant to noise and interference.

47. The medium according to claim 37, further comprising: instructions that cause a computer to employ a cyclic redundancy code to monitor for data corruption.

48. The medium according to claim 37, further comprising:
instructions that cause a computer to decrease power consumption by remaining in the sleep mode until a predetermined wake time; and instructions that cause a computer to decrease an elapse time in the wake mode by initiating communication with the collector and receiving the meter signal from the meter according to a predetermined schedule that facilitates efficient usage of processor cycles.

49. The medium according to claim 37, further comprising: instructions that cause a computer to identify the meter-side unit among a plurality of meter-side units by transmitting an identification signal.

50. The medium according to claim 37, further comprising: instructions that cause a computer to collect battery data; and instructions that cause a computer to predict battery failure in response to the battery data.

51. The medium according to claim 37, further comprising: instructions that cause a computer to transmit the meter signal according to a radio communication schema, the radio communication schema including a frequency hopping spread spectrum radio communication protocol that creates a jam resistant and noise resistant radio communications layer.

52. The medium according to claim 51, further comprising: instructions that cause a computer to reduce collisions by allowing an adjacent collector to operate on non-colliding communication frequency in accordance with the radio communications schema.

* * * * *